(12) United States Patent
Kim et al.

(10) Patent No.: US 11,072,324 B2
(45) Date of Patent: Jul. 27, 2021

(54) VEHICLE AND CONTROL METHOD THEREOF

(71) Applicants: HYUNDAI MOTOR COMPANY, Seoul (KR); KIA MOTORS CORPORATION, Seoul (KR)

(72) Inventors: Eungseo Kim, Suwon-si (KR); Tae Young Lee, Yongin-si (KR); Sangmin Lee, Seoul (KR); DongHyun Sung, Hwaseong-si (KR); Yongseok Kwon, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/705,707

(22) Filed: Dec. 6, 2019

(65) Prior Publication Data
US 2020/0391591 A1 Dec. 17, 2020

(30) Foreign Application Priority Data

Jun. 17, 2019 (KR) ........................ 10-2019-0071493

(51) Int. Cl.
| | | |
|---|---|---|
| *B60W 30/08* | (2012.01) | |
| *B60W 30/095* | (2012.01) | |
| *G08G 1/16* | (2006.01) | |
| *B60W 30/085* | (2012.01) | |
| *B60K 28/06* | (2006.01) | |
| *B60W 40/09* | (2012.01) | |
| *B60W 50/14* | (2020.01) | |
| *B60W 40/08* | (2012.01) | |

(52) U.S. Cl.
CPC .......... *B60W 30/08* (2013.01); *B60W 30/085* (2013.01); *B60W 30/0956* (2013.01); *G08G 1/16* (2013.01); *B60K 28/066* (2013.01); *B60W 40/09* (2013.01); *B60W 2040/0863* (2013.01); *B60W 2050/143* (2013.01)

(58) Field of Classification Search
CPC . B60K 28/066; B60K 28/06; B60W 30/0956; B60W 30/09; B60W 40/109; B60W 10/04; B60W 10/18; B60W 10/20; B60W 30/08; B60W 30/085; B60W 30/095; B60Q 9/008; B60Q 9/00; G08G 1/16; G08G 1/162; G08G 1/163; G08G 1/164; B60T 2201/00; B60T 2201/022; B60T 2202/024
USPC .......................... 340/436, 438, 576; 701/301
See application file for complete search history.

(56) References Cited

U.S. PATENT DOCUMENTS

| | | | | |
|---|---|---|---|---|
| 6,989,754 | B2 * | 1/2006 | Kisacanin | ............. G01S 13/867 |
| | | | | 340/576 |
| 8,704,653 | B2 * | 4/2014 | Seder | .................... G01S 13/723 |
| | | | | 340/461 |
| 9,650,041 | B2 * | 5/2017 | Feit | ......................... G06F 3/013 |
| 9,701,307 | B1 * | 7/2017 | Newman | ............. B60W 10/184 |

(Continued)

*Primary Examiner* — Van T Trieu
(74) *Attorney, Agent, or Firm* — Mintz Levin Cohn Ferris Glovsky and Popeo, P.C.; Peter F. Corless

(57) ABSTRACT

A vehicle includes an internal camera configured to acquire the driver's facial data to identify the driver's gaze region; an external sensor configured to acquire object data including at least one of a relative position and a relative speed of the object existing in all directions of the vehicle; and a controller configured to generate an advance warning signal.

20 Claims, 9 Drawing Sheets

(56) References Cited

U.S. PATENT DOCUMENTS 10,093,289 B2 * 10/2018 Lee .................... B60T 8/171
10,479,353 B2 * 11/2019 Nguyen Van ......... B60W 30/09

* cited by examiner

VEHICLE AND CONTROL METHOD THEREOF

CROSS-REFERENCE TO RELATED APPLICATION(S)

This application claims priority to and the benefit of Korean Patent Application No. 10-2019-0071493, filed on Jun. 17, 2019 in the Korean Intellectual Property Office, the disclosure of which is incorporated by reference in its entirety.

TECHNICAL FIELD

The present disclosure relates to a vehicle and a control method thereof, and more particularly, to a vehicle and a control method thereof, by detecting a driver's gaze and warning of a collision risk.

BACKGROUND

Autonomous driving technology can be classified into semi-autonomous driving, which allows the driver's manipulation intervention, and full autonomous driving, which does not require the driver's intervention.

The ultimate aim of autonomous driving technology is fully autonomous driving, but there are a lot of incomplete elements in the fully autonomous driving technology due to the lack of technology or additional communication infrastructure (e.g. V2X: Vehicle to Everything).

The disclosure of this section is to provide background information relating to the invention. Applicant does not admit that any information contained in this section constitutes prior art.

SUMMARY

One aspect of the present disclosure is to provide a vehicle and a control method of the vehicle that can give a driver a control right for collision avoidance in a timely manner only when a collision risk exists.

In accordance with one aspect of the present disclosure, a vehicle includes: an internal camera configured to acquire the driver's facial data to identify the driver's gaze region; an external sensor configured to acquire object data including at least one of a relative position and a relative speed of the object existing in all directions of the vehicle; and a controller configured to determine a possibility of collision between the vehicle and the object based on the object data, generate a control command for performing at least one of a braking control and a steering control to avoid a collision between the vehicle and the object at a second time point, generate a warning signal transmitted at the second time point when the object is present in the gaze region of the driver and generate an advance warning signal transmitted at a first time point that is earlier than the second time point when the object is not present in the gaze region of the driver.

When the object exists in the gaze region of the driver, the controller may determine that the driver recognizes the object and may not generate the advance warning signal.

When the object does not exist in the gaze region of the driver, the controller may determine that the driver does not recognize the object, and generate the advance warning signal to avoid a collision with the object through manual operation of the driver.

The controller may determine a center point of viewing zone of the driver, calculate a recognition index on the basis of a driver gaze distribution function and gaze holding time based on the center point, and determine at least a portion of the viewing zone as the gaze region when the recognition index is greater than or equal to a predetermined value.

The internal camera may acquire the facial data including at least one of a face direction of the driver and a pupil direction of the driver, and the controller may determine whether the gaze region of the driver belongs to a first area, a second area, or a third area and determine the presence of the object among the first area, the second area, and the third area, wherein the first area is an area including a driver's side window and a left side mirror, the second area is an area including a driving lane and a cluster of the vehicle, and the third area is an area including room mirror, a passenger side window and a right side mirror.

The controller may detect that the object exists in front of the vehicle, and may generate the advance warning signal to avoid collision with the object when determining that the driver's gaze region belongs to the first area or the third area.

The controller may detect that the object exists in the left rear side of the vehicle, and may generate the advance warning signal to avoid collision with the object when determining that the driver's gaze region belongs to the third area.

The controller detects that the object exists in the right rear side of the vehicle, and may generate the advance warning signal to avoid collision with the object when determining that the driver's gaze region belongs to the third area.

When the object is not in the viewing zone of the driver, the controller may calculate a gaze movement time for moving the center point of the viewing zone of the driver to the object and a avoidance control time for the driver to sense the object and avoid collision, and may generate the advance warning signal at a first time point at which the gaze movement time and the avoidance control time are secured.

The advance warning signal may include a display and a warning sound generated by a HMI (Human Machine Interface) provided in the vehicle and a vibration generated by the haptic module provided in the vehicle.

In accordance with one aspect of the present disclosure, a control method of a vehicle includes: acquiring facial data of the driver to be performed by a vehicle equipped with an internal camera and an external sensor to identify a driver's gaze region; acquiring object data including at least one of a relative position and a relative speed of the object existing in all directions of the vehicle; and generating an advance warning signal based on the facial data and the object data, wherein the generating of the advance warning signal includes: determining a possibility of collision between the vehicle and the object based on the object data; generating a control command for performing at least one of braking control and steering control to prevent a collision between the vehicle and the object at a second time point; generating a warning signal transmitted at the second time point when the object is present in the gaze region of the driver; and generating an advance warning signal transmitted at a first time point earlier than the second time point when the object is not present in the driver's gaze region.

When the object exists within the gaze region of the driver, the generating of the advance warning signal may include determining that the driver has recognized the object and not generating the advance warning signal.

When the object does not exist within the gaze region of the driver, the generating of the advance warning signal may include determining that the driver does not recognize the object, and generating the advance warning signal to avoid a collision with the object through manual operation of the driver.

The generating of the advance warning signal may include determining a center point of viewing zone of the driver, calculating a recognition index on the basis of a driver gaze distribution function and gaze holding time based on the center point, and determining at least a portion of the viewing zone as the gaze region when the recognition index is greater than or equal to a predetermined value.

The internal camera may acquire the facial data including at least one of a face direction of the driver and a pupil direction of the driver, and the generating of the advance warning signal may include determining whether the gaze region of the driver belongs to a first area, a second area, or a third area and determining the presence of the object among the first area, the second area, and the third area, wherein the first area is an area including a driver's side window and a left side mirror, the second area is an area including a driving lane and a cluster of the vehicle, and the third area is an area including room mirror, a passenger side window and a right side mirror.

The generating of the advance warning signal may include detecting that the object exists in front of the vehicle, and generating the advance warning signal to avoid collision with the object when determining that the driver's gaze region belongs to the first area or the third area.

The generating of the advance warning signal may include detecting that the object exists in the left rear side of the vehicle, and generating the advance warning signal to avoid collision with the object when determining that the driver's gaze region belongs to the third area.

The generating of the advance warning signal may include detecting that the object exists in the right rear side of the vehicle, and generating the advance warning signal to avoid collision with the object when determining that the driver's gaze region belongs to the third area.

When the object is not in the viewing zone of the driver, the generating of the advance warning signal may include calculating a gaze movement time for moving the center point of the viewing zone of the driver to the object and a avoidance control time for the driver to sense the object and avoid collision, and generating the advance warning signal at a first time point at which the gaze movement time and the avoidance control time are secured.

The advance warning signal may include a display and a warning sound generated by a HMI (Human Machine Interface) provided in the vehicle and a vibration generated by the haptic module provided in the vehicle.

In accordance with one aspect of the present disclosure, the safety of the autonomous driving function can be ensured by giving the driver a chance to avoid collision only when there is a possibility of a collision while preventing of the operation of the unnecessary advance warning.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
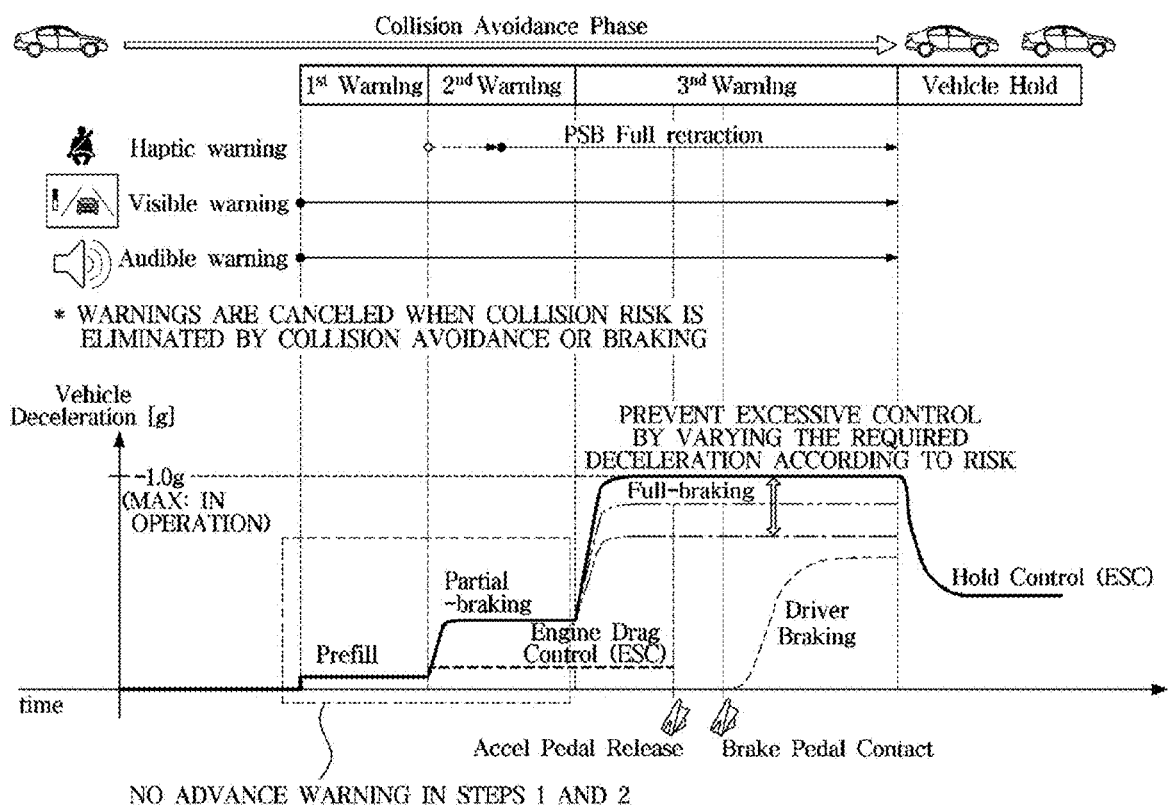
FIG. 1 is a view for explaining an implementation of the operation of a collision avoidance system.

In the following description, like reference numerals refer to like elements throughout the specification. Well-known functions or constructions are not described in detail since they would obscure one or more embodiments with unnecessary detail. Terms such as "unit," "module," "device" and "apparatus" may be embodied as hardware or software. According to embodiments, a plurality of "units," "modules," "devices" and "apparatuses" may be implemented as a single component or a single "unit," "module," "device" and "apparatus" may include a plurality of components.

It will be understood that when an element is referred to as being "connected" to another element, it can be directly or indirectly connected to the other element, wherein the indirect connection includes connection via a wireless communication network.

In addition, when some part "includes" some elements, unless explicitly described to the contrary, it means that other elements may be further included but not excluded.

Throughout the specification, when a member is referred to as being located "on" another member, a third member may be present between the two members in addition to the two members being in contact.

The terms such as "first" or "second" may be used to distinguish one element from another, but the elements are not limited to the terms Singular forms are intended to include plural forms unless the context clearly indicates otherwise.

Reference numerals of operations are used for convenience of description, and the reference numerals do not indicate the order of the operations. The operations may be performed in an order that is different from the described order unless a specific order is clearly described in context.

Hereinafter, an operation principle and embodiments of the present disclosure will be described with reference to the accompanying drawings.

In some implementations, many vehicles apply the semi-autonomous driving technology that allows the driver's intervention. For example, the FCA-JT/LO/LS, BCA-R/S, and BCA-R systems, which perform all braking control in the semi-autonomous driving technology, provide warning signals simultaneously with braking/avoidance control without advance warning in the event of a collision risk, since frequent advance warnings can interfere with the driver's concentration even if no collision occurs.

Therefore, the collision avoidance assistance system in such vehicles does not give the driver a control right. Thus, the collision avoidance does not meet the purpose of the semi-autonomous driving technology, and has a risk that can lead to a collision in a situation in which collision cannot avoid in a high speed region.

FIG. 1 is a view for explaining an implementation of the operation of a collision avoidance system.

Front Collision Assistance (FCA) system determines a collision risk with a front object in a driving situation by using a front recognition sensor mounted on a vehicle, and provides a warning to the driver when a collision risk is present, while automatically braking to reduce or avoid a collision.

Blind Spot Collision Avoidance Assist-side (BCA) system determines the risk of collision with a subject behind or in blind spots during driving by using a rear-recognition sensor mounted on the vehicle, and provides a warning to the driver when a collision risk is present, while automatically braking to reduce or avoid a collision.

The system described above is developing an FCA-JT (Junction Turning)/LO (Lane Change Oncoming)/LS (Lane Change Side), BCA-R/S(Rear/Side), BCA-R(Rear) technology that applies a sensor capable of detecting all directions of the vehicle in order to enlarge the operating area and the protection area, and performs both steering control and braking control.

Meanwhile, referring to FIG. 1, a graph of a braking level and a warning signal according to a time sequence based on a collision point is illustrated. Here, the highlighted areas (first step and second step) represent time periods in which the advance warning is performed before the braking control is performed. However, the actual FCA system provides a visual, audio, or tactile warning signal while performing braking control without performing an advance warning in the first or second stage, in order to prevent the driver's concentration by performing frequent advance warning even though there is no collision.

Unlike the collision avoidance assistance system disclosed in FIG. 1, the present disclosure may provide an advance warning signal only if there is a risk of collision by identifying whether a driver recognizes an object using an internal camera provided in a vehicle interior. Specific means for implementing this will be described below.

Figure 2:
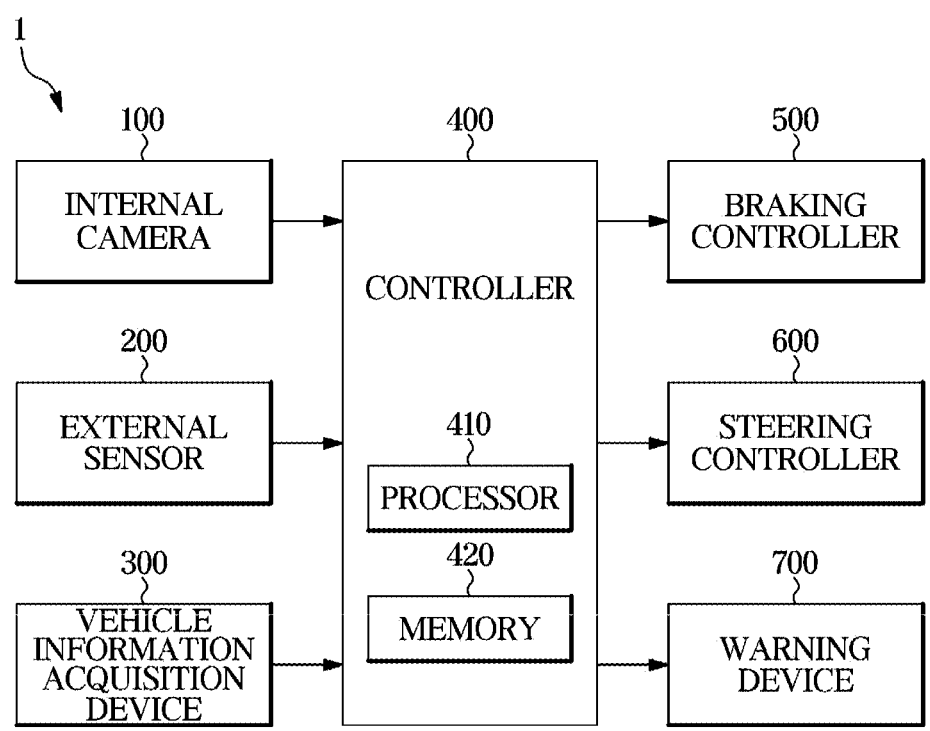
FIG. 2 is a control block diagram of a vehicle according to an embodiment.

FIG. 2 is a control block diagram of a vehicle according to an embodiment.

In accordance with an embodiment, a vehicle may include an internal camera 100 takes images of the driver and acquires facial data of a driver, an external sensor 200 configured to detect an object and acquire motion information of the object, a vehicle information acquisition device 300 configured to acquire information about a state of the vehicle, a controller 400, a braking controller 500, a steering controller 600, and a warning device 700.

The internal camera 100 may be a camera installed inside the vehicle 1 and photographing a face of a driver. The internal camera 100 includes all photographing devices that may acquire a face image of a driver and provide data for image processing. In addition, the internal camera 100 may be an infrared ray (IR) camera so as to accurately acquire a face image of the driver even when driving at night. Although the installation position of the internal camera 100 is not particularly limited, it is recommended to be installed in the front row of a face position a driver in order to photograph a face of the driver.

In embodiments, the external sensor 200 may include at least one of various types of sensors capable of recognizing an object located near the vehicle 1 and acquiring state information such as relative position and relative speed of the recognized object. For example, the external sensor 200 may include a front sensor for acquiring information about an object located in the front, a rear sensor for acquiring information about an object located in the rear, and a rear side sensor for acquiring information about an object located in the rear side or the blind spot. Each sensor may be implemented by any one of a camera, a radar, and a lidar, or may adopt at least two or more types by applying sensor fusion technology.

For example, the front sensor may include a front radar provided in the front center area of the vehicle 1 and a front side radar provided in the front left/right regions, respectively.

The front radar and the front side radar may detect the distance and relative speed with the surrounding object by using the Doppler frequency shift between the transmitting wave and the receiving wave.

In addition, the front sensor may further include a front camera installed toward the front of the vehicle 1. The front camera may adopt a CMOS image sensor or a CCD image sensor.

The rear sensor may include a rear radar provided in the rear left/right regions of the vehicle 1, respectively and may include a rear camera installed in the rear central region.

Although the above-described example has been described with respect to the front sensor and the rear sensor, the mounting position, the operating principle and the function with respect to the rear side sensor can be easily understood by a person skilled in the art.

In embodiments, the vehicle information acquiring device 300 may include at least one of various sensors capable of acquiring information regarding a speed or an attitude of the vehicle 1. The vehicle information acquiring device 300 may include a vehicle speed sensor for detecting the speed of the vehicle 1, an acceleration sensor for detecting the acceleration of the vehicle 1, and an angular velocity sensor for detecting the angular velocity of the vehicle 1.

The vehicle speed sensor may be implemented as a wheel speed sensor configured to detect a wheel speed, and the wheel speed sensor may include a wheel speed sensor configured to detect a wheel speed of at least one of a front wheel and a rear wheel of the vehicle 1.

The acceleration sensor may include a longitudinal acceleration sensor that outputs an acceleration in a height direction of the vehicle 1, that is, an acceleration in a Z-axis direction, and a lateral acceleration sensor that outputs acceleration in the lateral direction of the vehicle 1, that is, acceleration in the Y-axis direction.

The longitudinal acceleration sensor and the lateral acceleration sensor may be implemented as separate sensor modules, or may be implemented as one sensor module. The angular velocity sensor is a sensor for measuring the attitude of the vehicle 1 and may also be referred to as a gyro sensor. The angular velocity sensor may include a roll rate sensor that detects a rotational angular velocity in a roll direction of the vehicle 1, and a yaw rate sensor that detects rotational angular velocity in a yaw direction of the vehicle 1. The roll rate sensor and the yaw rate sensor may also be implemented as separate sensor modules, or may be implemented as one sensor module.

In embodiments, one or more controllers 400 determines the possibility of collision with the object based on the information acquired by the internal camera 100, the external sensor 200, and the vehicle information acquiring device 300, and generates a warning signal or an advance warning signal based on the possibility of collision.

In detail, the controller 400 receives object data including at least one of facial data of a driver acquired by the internal camera 100 and relative position and relative speed of the object acquired by the external sensor 200.

The controller 400 may determine a possibility of collision between the vehicle and the object based on the provided object data, and generate a control command for performing at least one of a braking control and a steering control for preventing a collision between the vehicle and the object at a second time point, when there is a possibility of collision.

In embodiments, the second time point refers to a time point at which a warning signal is provided to the driver at a time point when braking control or steering control is performed. The controller 400 may provide an advance warning signal at a first time point that is earlier than the second time point. Specifically, the second time point is a time point before predetermined time from a time point when the braking control or the steering control is performed, and is a time point for providing an advance warning to the driver and providing an opportunity for collision avoidance by manual operation of the driver, when it is determined that the driver does not recognize the object.

The controller 400 may generate a warning signal transmitted at a second time point when the object exists in the gaze region of the driver. In this case, since the driver can be seen as a situation in which the driver recognizes the object, the controller 400 may perform a braking control or a steering control to prevent a sudden collision without generating the advance warning signal rather than giving the driver a chance to avoid a collision due to an advance warning.

Unlike the above-described case, in embodiments, when the object does not exist in the gaze region of the driver, the controller 400 may generate an advance warning signal transmitted at a first time point before the second time point. If the object does not exist in the gaze region of the driver, it means that the driver does not recognize the object. Specifically, the controller 400 provides the driver with an advance warning signal, thereby giving the driver an opportunity to recognize an object that has not been recognized, and giving a collision avoidance that can be avoided the object when the driver recognizes the object. The time point calculation and the specific principle related to the above-described process will be described below.

The controller 400 may include at least one memory 420 in which a program for performing the above-described operation and the operation described below are stored, and at least one processor 410 for executing the stored program. When the controller 400 includes a plurality of memories 420 and a plurality of processors 410, the plurality of memories 420 and the plurality of processors 410 may be directly connected to one chip, or may be physically separated.

In embodiments, the braking controller 500 performs control for the vehicle 1 to avoid collision with the object, by receiving a control signal from the controller 400 and operating a brake pedal or an accelerator pedal at a time point where collision avoidance is possible.

The steering controller 600 performs control for the vehicle 1 to avoid collision with the object, by receiving a control signal from the controller 400 and operating the steering wheel at a time point where collision avoidance is possible.

The warning device may notify the driver of a collision risk by providing an advance warning signal or a warning signal at the first time point or the second time point based on the control of the controller 400. The warning device 700 may notify the driver of a collision risk by stimulating at least one of the driver's sight, hearing, and touch.

For example, the warning device 700 may provide an indication and a warning sound to a driver through an HMI (Human Machine Interface) provided in the vehicle 1, or may provide an advance warning signal or warning signal to the driver through vibration generated by the haptic module provided in the vehicle 1.

Figure 3:
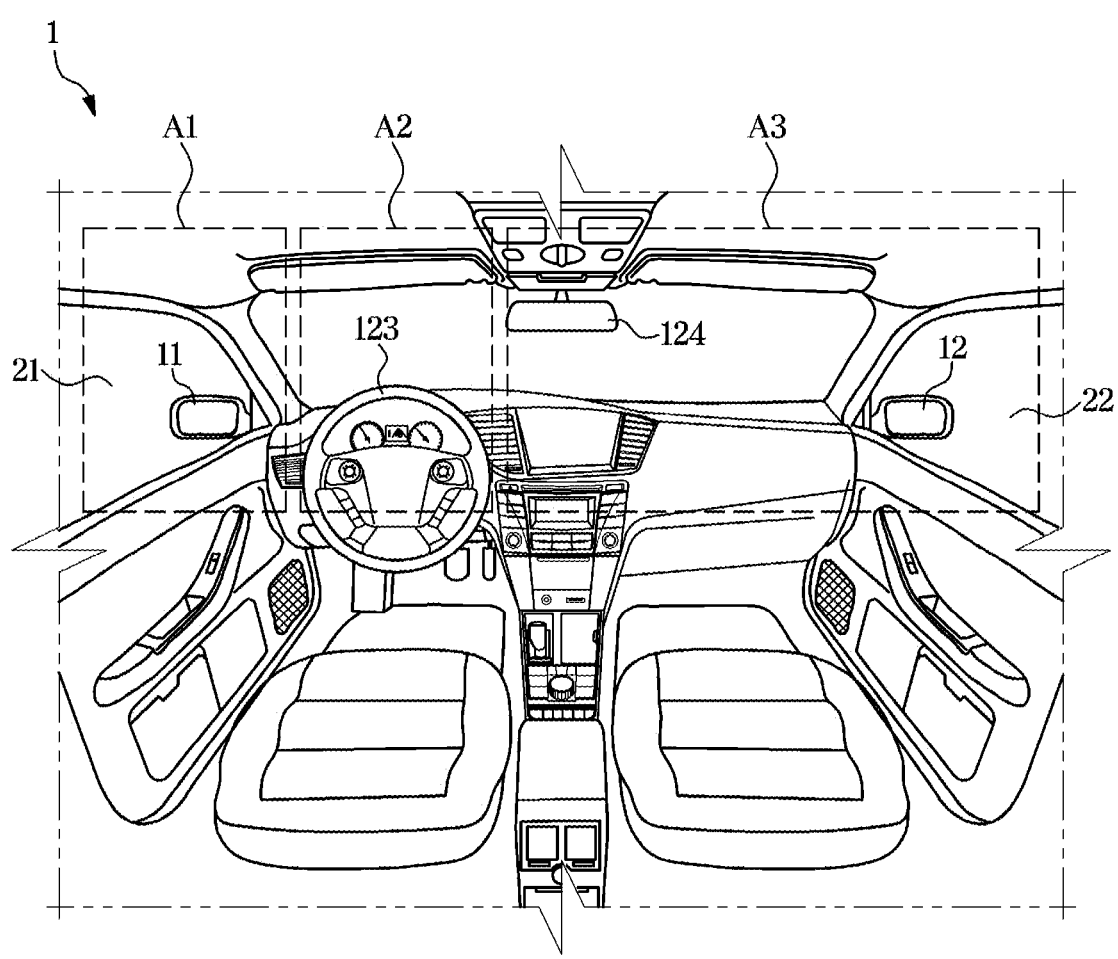
FIG. 3 shows a gaze region of a driver classified into first to third regions.

On the other hand, the gaze region of the driver is ideal to be the area that the driver actually recognizes, but there is a limit in grasping based on the acquired facial data. Accordingly, an embodiment of the present invention provides a method of accurately identifying inattention of a driver by dividing an area that the driver can recognize into three areas. FIG. 3 illustrates a gaze region of a driver classified into first to third regions.

First, the controller 400 determines a gaze region of a driver by acquiring facial data of the driver acquired by the internal camera 100 provided in the vehicle 1. The facial data may include at least one of face direction and pupil direction of a driver.

Referring to FIG. 3, the gaze region of the driver may be divided into a first area A1, a second area A2, and a third area A3.

For example, when it is determined that the gaze region of the driver corresponds to the first area A1, it may be determined that the driver's gaze is on the left side or the left rear side so that the driver does not recognize the front, the right side, and the right rear side.

The controller 400 determines that the gaze region of the driver is the first area A1 when it is determined that the driver's gaze is in the left side mirror 11 or the driver's side window 21 based on the driver's face data.

Here, when the controller 400 detects the object from the front, rear, right, or right rear of the vehicle 1, the controller 400 may determine that the driver does not recognize the object and generate an advance warning signal.

As another example, when it is determined that the gaze region of the driver corresponds to the second area A2, it may be determined that the driver's gaze is in the front or the rear so that the driver does not recognize the left, the left rear, the right and the right rear. When it is determined that the driver's gaze is in the cluster 123, the room mirror 124, or the head up display based on the driver's facial data, the controller 400 may determine that the gaze region of the driver is the second area A2. Here, when the controller 400 detects an object from the left side, the left rear side, the right side, or the right rear side of the vehicle 1, the controller 400 may recognize that the driver does not recognize the object and generate an advance warning signal.

As another example, when it is determined that the gaze region of the driver corresponds to the third area A3, it may be determined that the driver's gaze is on the right side or the right rear side so that the driver does not recognize the front, rear, left and rear sides. When it is determined that the driver's gaze is in the right side mirror 12 or the passenger seat side window 22 based on the driver's facial data, the controller 400 may determine that the driver's gaze region is the third area A3. Here, when the controller 400 detects an object in front, rear, left, or left rear of the vehicle 1, the controller 400 may determine that the driver does not recognize the object and generate an advance warning signal.

Hereinafter, the detailed logic for determining the gaze region of the driver and the calculation of the advance warning signal generation time will be described in detail.

First, the controller 400 calculates the presence or absence of an object for each system in the gaze region of the driver. Here, the system refers to each collision avoidance system of the FCA system or the BCA system. The presence or absence of an object based on two-dimensional coordinates is expressed as a formula below.

$$I\_DSW = f(x,y) \quad \text{[Formula 1]}$$

Figure 4:
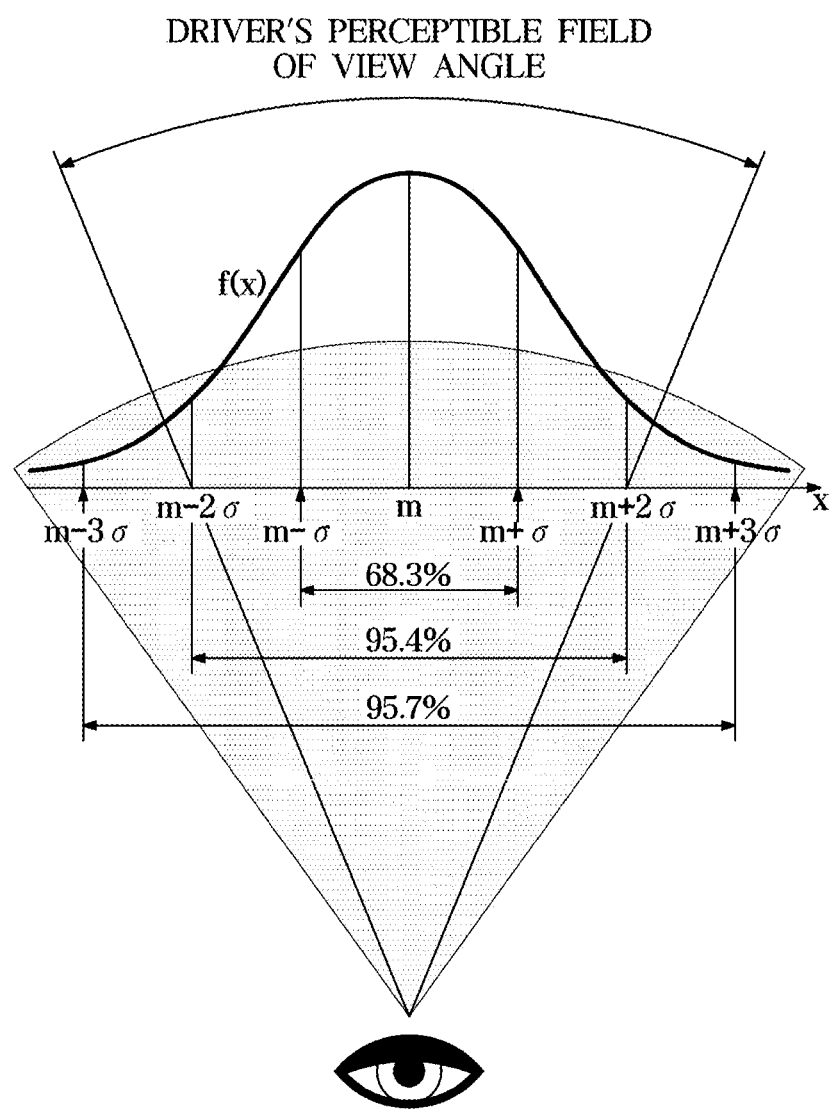
FIG. 4 shows a driver gaze distribution function.

Next, the controller 400 determines a center point of the driver's viewing zone, and calculates an index based on the driver's attention concentration distribution based on the center point. Referring to FIG. 4, the driver gaze distribution function may be defined in the form of a normal distribution density function. This is because the recognition rate of an object existing outside a certain range drops sharply based on the center line of the driver's viewing angle. The driver gaze distribution function may be defined as an exponential function that is symmetric about the y axis.

In addition, the driver gaze distribution function may be defined in a two-dimensional coordinate system. The controller 400 may set a two-dimensional coordinate system having a center line of the driver's viewing angle as a vertical axis and a straight line passing through a specific coordinate of the front object as a horizontal axis, and calculate a driver gaze distribution function on the two-dimensional coordinate system.

The driver gaze distribution function has 0 as the minimum value and 1 as the maximum value. When the front object is on the center line of the driver's viewing angle, which is the longitudinal axis of the driver's gaze distribution function, the driver gaze distribution function has a maximum value, and when the front object is located at a distance far from the center line of the driver's viewing angle, the driver gaze distribution function has a small value.

In embodiments, the controller 500 may acquire the coordinates of the front object and calculate a value of the driver gaze distribution function using the coordinates of the front object. When the value of the driver gaze function is calculated, the controller 400 may calculate a recognition index indicating a driver's recognition degree of the gaze region. The recognition index may be calculated according to Formula 2 below.

$$I\_DSW\_Prob = A(t)*f(x,y)*g\_prob(t,x,y) \quad \text{[Formula 2]}$$

In Formula 2, A(t) is a value based on gaze holding time by gaze tracking, f(x, y) is a value indicating whether an object exists in two-dimensional coordinates, and g_prob(t, x, y) is a driver gaze distribution function.

In one embodiment, the controller 400 may determine a center point for the driver's viewing zone, calculate a recognition index based on the driver gaze distribution function and the gaze holding time based on the center point, and, determine at least a portion of the viewing zone as a gaze region when the recognition index is greater than or equal to a predetermined value.

Figure 5:
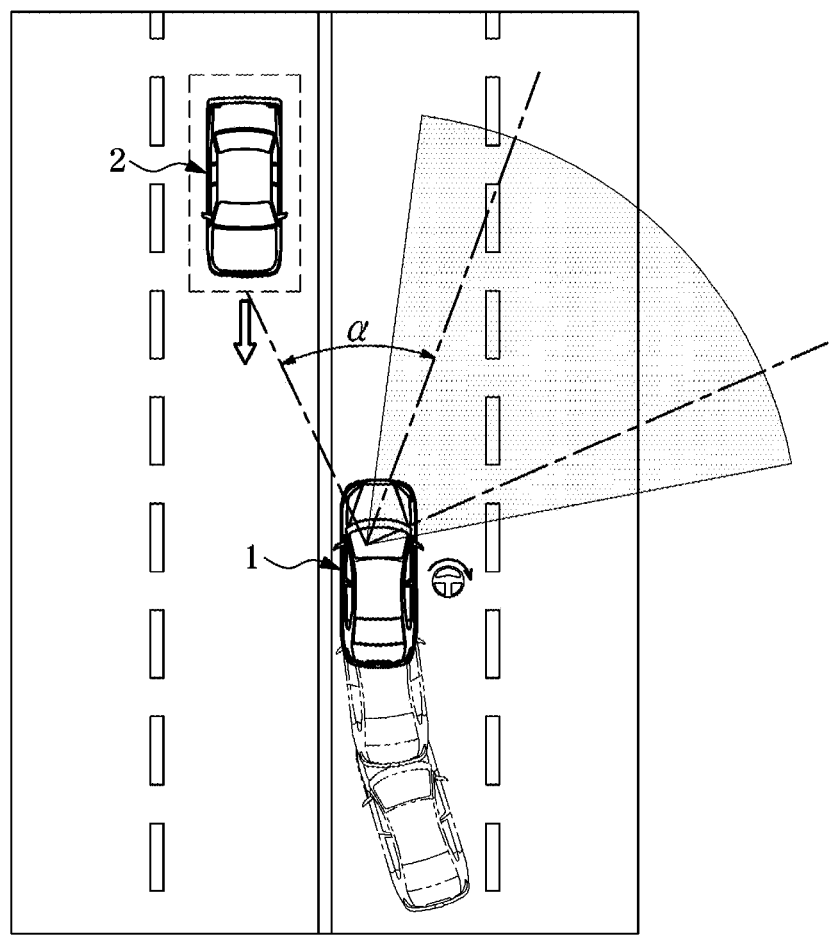
FIG. 5 is a view for explaining a gaze movement time of a driver.
Figure 5:
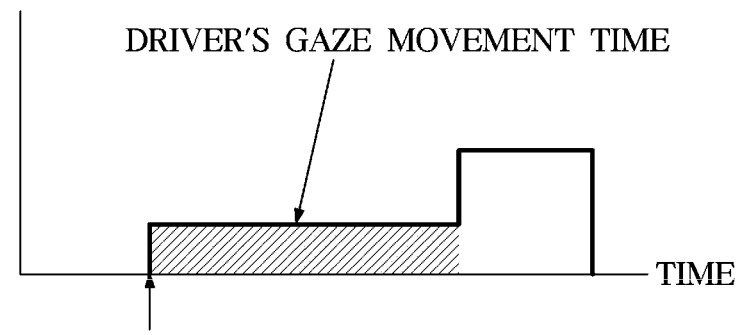

Next, a detailed method of calculating the driver's gaze movement time and avoidance control time will be described with reference to FIGS. 5 and 6.

The time point at which the advance warning signal is provided should have sufficient time for the driver to move the gaze to the subject and allow the driver to directly avoidance operation after the movement. Therefore, the second time point at which the advance warning signal is provided is calculated in consideration of the driver's gaze movement time and the avoidance control time.

First, the gaze movement time refers to the time until the driver changes his gaze to identify an object and to manipulate to avoid collision with the object. Referring to FIG. 5 and Formula 3 below, the driver's gaze movement time may be calculated as follows.

$$C*Tgt\_angle(\alpha,\beta)/Head\_ang\_rate(\alpha,\beta) \quad \text{[Formula 3]}$$

In Formula 3, C corresponds to the correction coefficient, α indicates the left and right angles in the gaze direction, and β indicates the vertical angle in the gaze direction. A gaze movement time may be calculated based on a value acquired by dividing a gaze rotational angular velocity by an angle between a driver's gaze direction and an object.

Next, the avoidance control time indicates an opportunity time for avoiding collision with the object after the driver recognizes the object. Referring to FIG. 6 and Equation 4 below, the avoidance control time may be calculated as follows.

Figure 6:
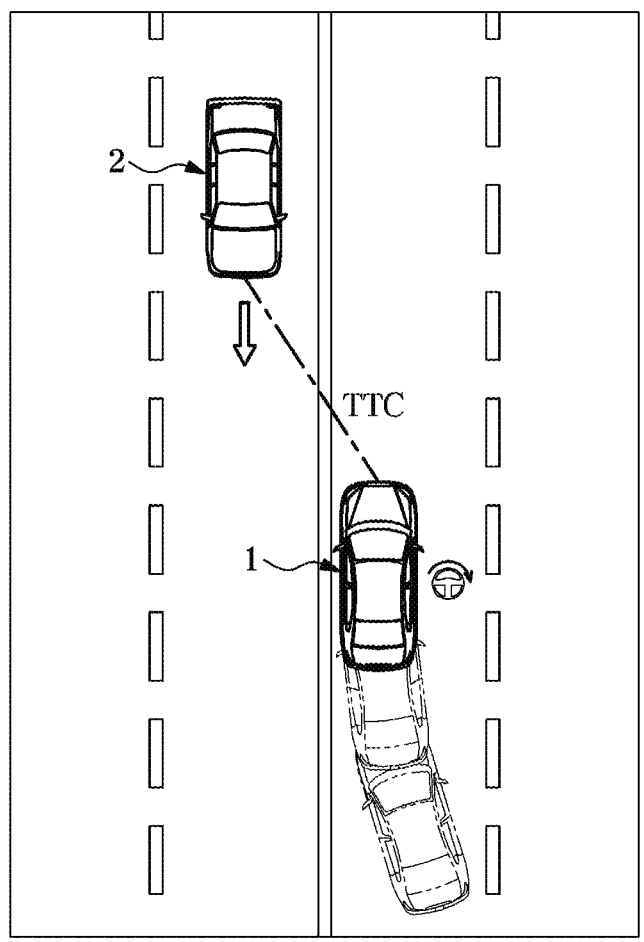
FIG. 6 a view for explaining a driver's avoidance control time.
Figure 6:
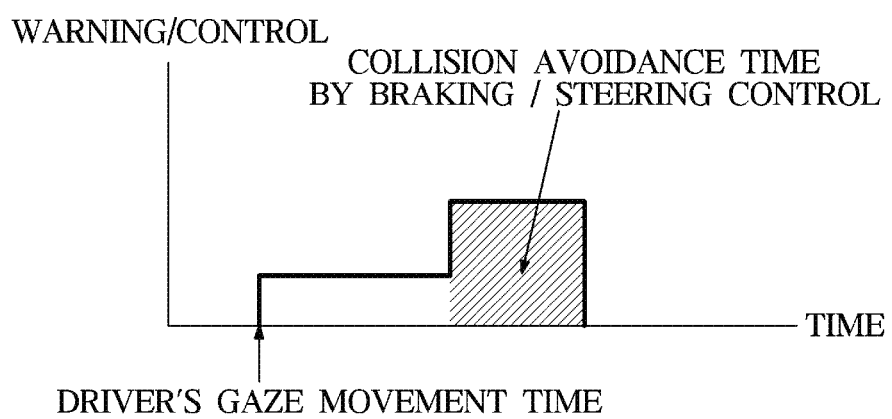

Referring to FIG. 6 and Formula 4 below, the avoidance control time may be calculated as follows.

$$C\_drv\_avoid\_time = \text{Max[Longitudinal/lateral time to collision, In-road return time by assisted by lane departure steering/braking control]} \quad \text{[Formula 4]}$$

When collected, the following formula is derived, and the controller 400 transmits an advance warning signal at a first time point, which is a time point for securing the following time.

$$TTC\_WARN = I\_DSW\_Prob*(C*Tgt\_angle(\alpha,\beta)/Head\_ang\_rate(\alpha,\beta)) + C\_drv\_avoid\_time \quad \text{[Formula 5]}$$

According to an embodiment of the present disclosure, when the object is not in the driver's viewing zone, the controller 400 may detect a gaze movement time for moving the center point of the driver's viewing zone to the object and the driver, calculate a avoidance control time for avoiding a collision, and generate an advance warning signal at a first time point where the gaze movement time and the avoidance control time are secured.

Figure 7:
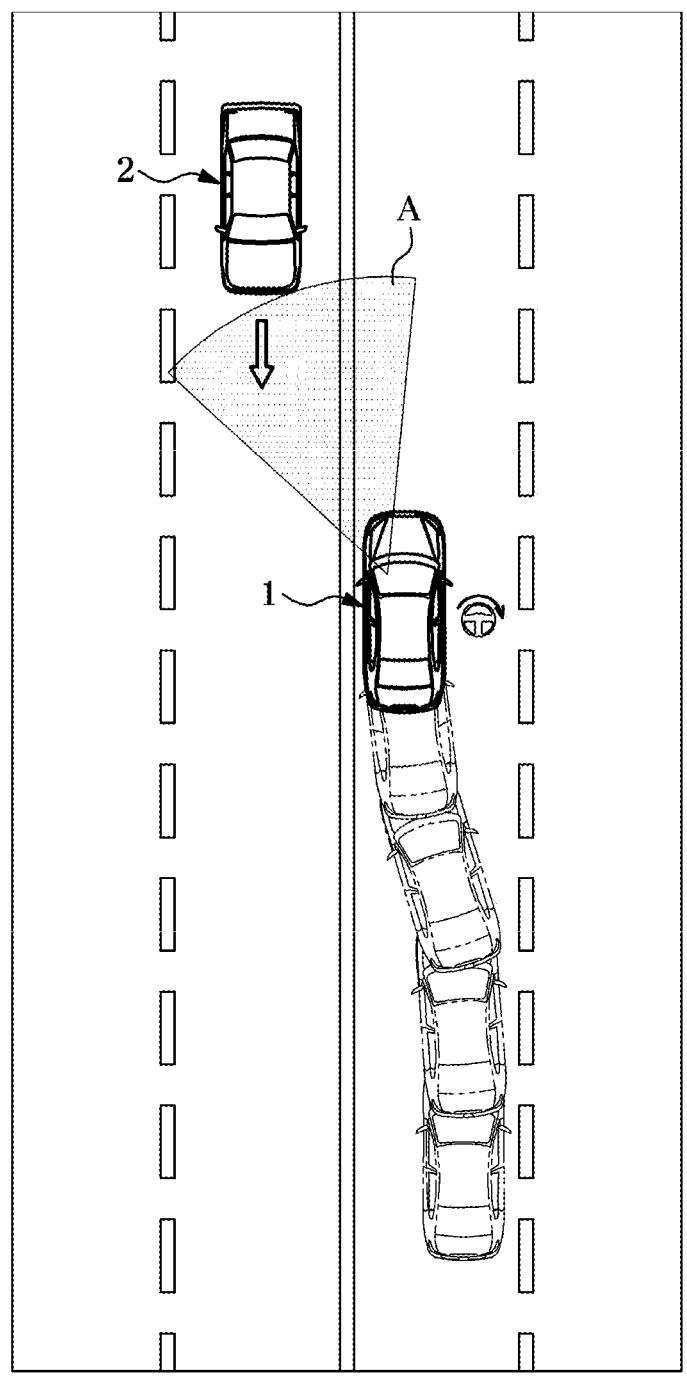
FIGS. 7 and 8 are a view for explaining an example of generation and non-generation of the advance warning signal.
Figure 8:
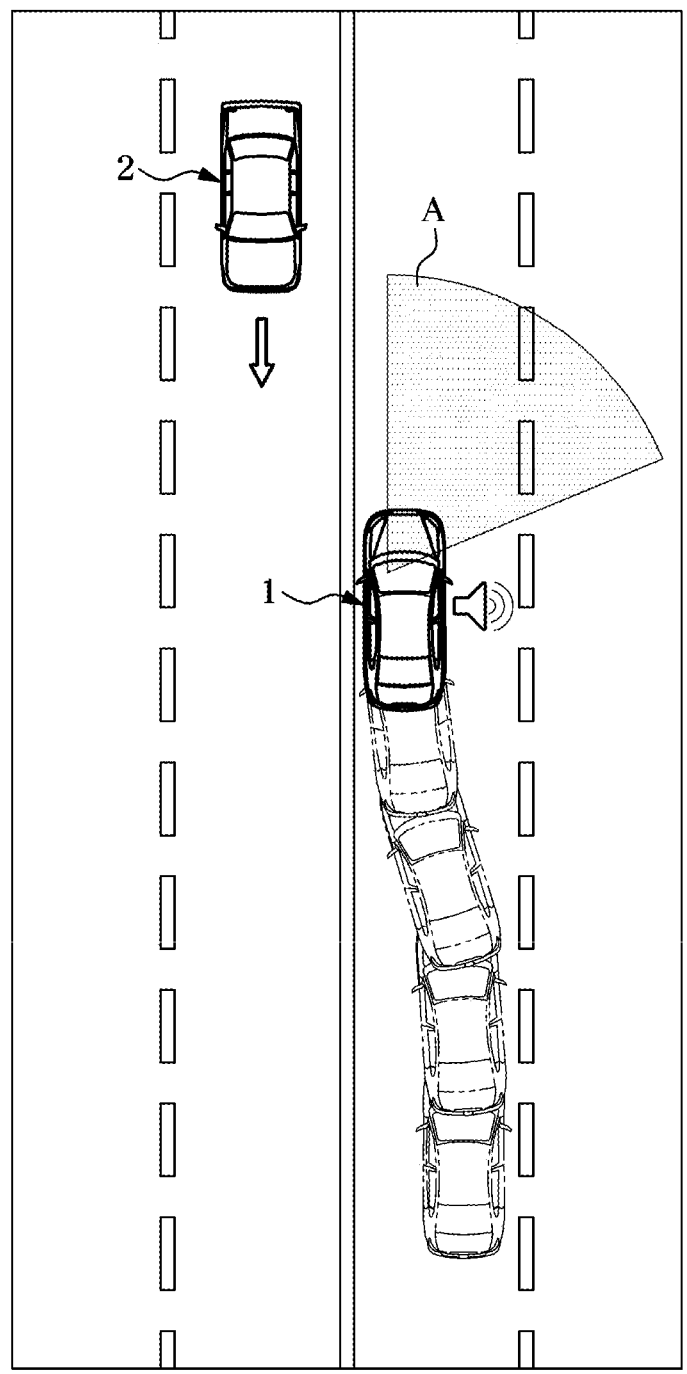

Referring to FIGS. 7 and 8, an example of a case where an advance warning signal is generated and a case where the advance warning signal is not generated will be described.

Referring to FIG. 7, the controller 400 does not generate an advance warning signal when the object 2 exists in the gaze region A of the driver.

For example, when there is a possibility of collision at an unexpected time, the driver may perform automatic braking control or steering control by the controller 400, without generating an advance warning signal when the object 2 exists in front of the vehicle 1 and the driver watches the object 2 as shown in FIG. 7.

The above-described control operation can be applied to the FCA-JT/LO/LS system, which is a front collision avoidance assistance system. In addition, it can be applied to the BCA-R/S or BCA-R system that is a rear side collision avoidance system, of course.

Referring to FIG. 8, the controller 400 generates an advance warning signal when the object 2 does not exist in the gaze region A of the driver.

For example, when the object 2 exists in front of the vehicle 1 and the driver is looking at the right side of the room and the driver does not recognize the object 2 as shown in FIG. 8, the controller 400 generates an advance warning signal and provides it to the driver so that the driver can recognize the object 2 and avoid a direct collision.

The above-described control operation may be applied to the FCA-JT/LO/LS system, which is the front collision avoidance assistance system. In addition, it can be applied to the BCA-R/S or BCA-R system that is a rear side collision avoidance system, of course.

Figure 9:
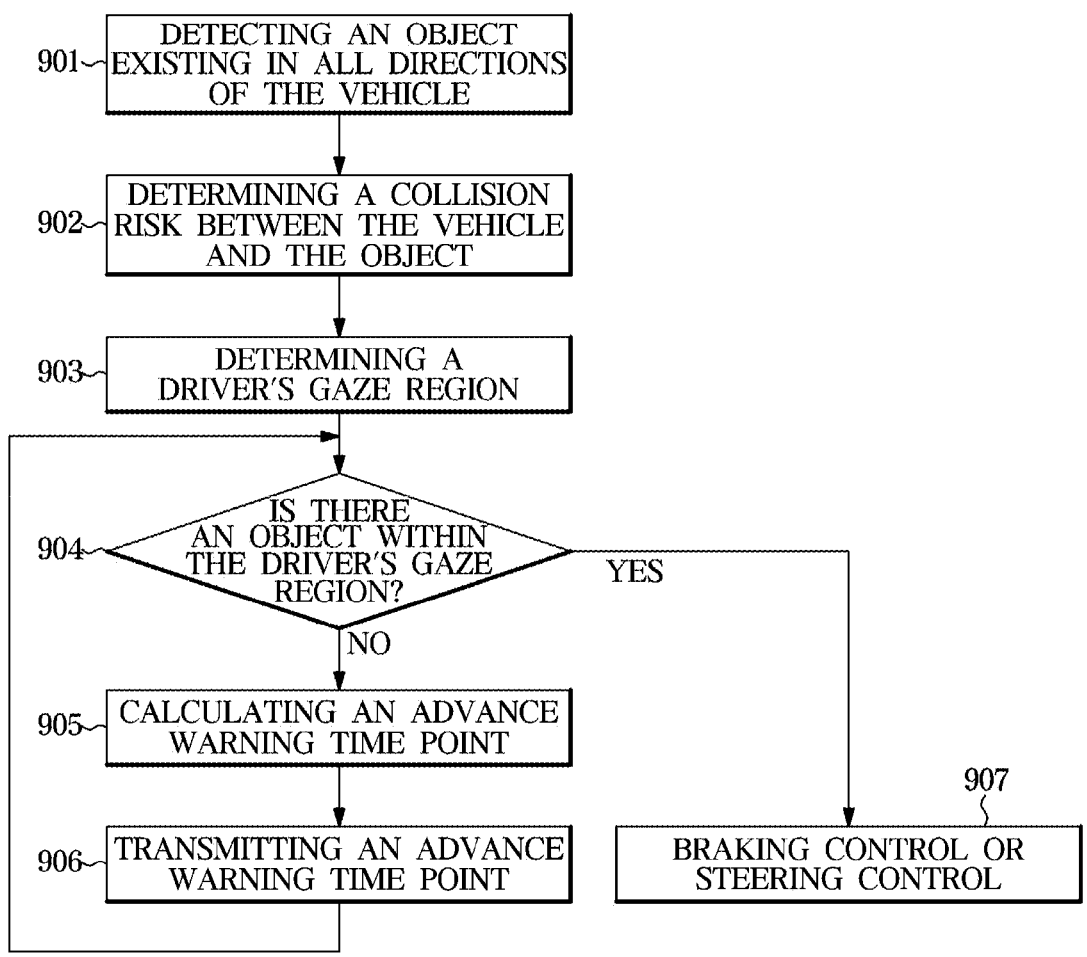
FIG. 9 is a flowchart of a control method of a vehicle according to an embodiment.

FIG. 9 is a flowchart of a control method of a vehicle according to an embodiment.

The controller 400 detects an object existing in all directions of the vehicle (901). Device means provided in the vehicle for detecting the object has already been described above. When the controller 400 detects the object, the controller 400 determines a collision risk between the vehicle 1 and the object (902).

The controller 400 determines a driver's gaze region (903), and determines whether an object exists in the driver's gaze region (904).

When the object exists in the driver's gaze region, no advance warning signal is generated, and when there is a risk of collision with the object in the gaze region, the controller 400 performs braking control or steering control by automatic control (907).

In contrast, when the object does not exist in the driver's gaze region, the advance warning time point (second time point) is calculated (905), and the advance warning signal is provided to the driver at the calculated warning time point (906).

Meanwhile, the disclosed embodiments may be embodied in the form of a recording medium storing instructions executable by a computer. The instructions may be stored in the form of a program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored. For example, there may be Read Only Memory (ROM), Random Access Memory (RAM), a magnetic tape, a magnetic disk, a flash memory, and an optical data storage device.

Logical blocks, modules or units described in connection with embodiments disclosed herein can be implemented or performed by a computing device having at least one processor, at least one memory or at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle comprising:
an internal camera configured to acquire facial data of a driver to identify a driver's gaze region;
an external sensor configured to acquire object data of an object, the object data including at least one of a relative position and a relative speed of the object existing in all directions of the vehicle; and
a controller configured to
  determine a possibility of collision between the vehicle and the object based on the object data,
  generate a control command for performing at least one of a braking control and a steering control to avoid a collision between the vehicle and the object at a second time point,
  generate a warning signal transmitted at the second time point when the object is present in the gaze region of the driver and
  generate an advance warning signal transmitted at a first time point that is earlier than the second time point when the object is not present in the gaze region of the driver.

2. The vehicle of claim 1, wherein when the object exists in the gaze region of the driver, the controller is configured to determine that the driver recognizes the object and does not generate the advance warning signal before the second time point.

3. The vehicle of claim 1, wherein when the object does not exist in the gaze region of the driver, the controller is configured to determine that the driver does not recognize the object, and generate the advance warning signal to avoid a collision with the object through manual operation of the driver at the first time point.

4. The vehicle of claim 1, wherein, the controller is configured to determine a center point of a viewing zone of the driver, calculate a recognition index on a basis of a driver gaze distribution function and gaze holding time based on the center point, and determine at least a portion of the viewing zone as the gaze region when the recognition index is greater than or equal to a predetermined value.

5. The vehicle of claim 1, wherein, the internal camera is configured acquire the facial data including at least one of a face direction of the driver and a pupil direction of the driver, and the controller is configured to determine whether the gaze region of the driver belongs to a first area, a second area, or a third area and determine a presence of the object among the first area, the second area, and the third area, and
  wherein the first area is an area including a driver's side window and a left side mirror, the second area is an area including a driving lane and a cluster of the vehicle, and the third area is an area including room mirror, a passenger side window and a right side mirror.

6. The vehicle of claim 5, wherein, the controller is configured to detect that the object exists in front of the vehicle, and generate the advance warning signal to avoid collision with the object when determining that the driver's gaze region belongs to the first area or the third area.

7. The vehicle of claim 5, wherein, the controller is configured to detect that the object exists in the left rear side of the vehicle, and generate the advance warning signal to avoid collision with the object when determining that the driver's gaze region belongs to the third area.

8. The vehicle of claim 5, wherein, the controller is configured to detect that the object exists in the right rear side of the vehicle, and generate the advance warning signal to avoid collision with the object when determining that the driver's gaze region belongs to the third area.

9. The vehicle of claim 1, wherein, when the object is not in the viewing zone of the driver, the controller is configured to calculate a gaze movement time for moving a center point of a viewing zone of the driver to the object and a avoidance control time for the driver to sense the object and avoid collision, and generate the advance warning signal at a first time point at which the gaze movement time and the avoidance control time are secured.

10. The vehicle of claim 1, wherein, the advance warning signal includes a display and a warning sound generated by an HMI (Human Machine Interface) provided in the vehicle and a vibration generated by a haptic module provided in the vehicle.

11. A method for controlling a vehicle equipped with an internal camera and an external sensor, the method comprising:
acquiring facial data of a driver to identify a driver's gaze region;

acquiring object data of an object, the object data including at least one of a relative position and a relative speed of the object existing in all directions of the vehicle; and generating an advance warning signal based on the facial data and the object data, wherein the generating of the advance warning signal, comprising:

determining a possibility of collision between the vehicle and the object based on the object data;

generating a control command for performing at least one of braking control and steering control to avoid a collision between the vehicle and the object at a second time point;

generating a warning signal transmitted at the second time point when the object is present in the gaze region of the driver; and generating an advance warning signal transmitted at a first time point earlier than the second time point when the object is not present in the driver's gaze region.

12. The method of claim 11, wherein, when the object exists within the gaze region of the driver, the generating of the advance warning signal includes determining that the driver has recognized the object and not generating the advance warning signal before the second time point.

13. The method of claim 11, wherein, when the object does not exist within the gaze region of the driver, the generating of the advance warning signal includes determining that the driver does not recognize the object, and generating the advance warning signal to avoid a collision with the object through manual operation of the driver at the first time point.

14. The method of claim 11, wherein, the generating of the advance warning signal includes determining a center point of a viewing zone of the driver, calculating a recognition index on a basis of a driver gaze distribution function and gaze holding time based on the center point, and determining at least a portion of the viewing area as the gaze region when the recognition index is greater than or equal to a predetermined value.

15. The method of claim 11, wherein, the internal camera acquires the facial data including at least one of a face direction of the driver and a pupil direction of the driver, and the generating of the advance warning signal includes determining whether the gaze region of the driver belongs to a first area, a second area, or a third area and determining a presence of the object among the first area, the second area, and the third area, wherein the first area is an area including a driver's side window and a left side mirror, the second area is an area including a driving lane and a cluster of the vehicle, and the third area is an area including room mirror, a passenger side window and a right side mirror.

16. The method of claim 15, wherein, the generating of the advance warning signal includes detecting that the object exists in front of the vehicle, and generating the advance warning signal to avoid collision with the object when determining that the driver's gaze region belongs to the first area or the third area.

17. The method of claim 15, wherein, the generating of the advance warning signal includes detecting that the object exists in the left rear side of the vehicle, and generating the advance warning signal to avoid collision with the object when determining that the driver's gaze region belongs to the third area.

18. The method of claim 15, wherein the generating of the advance warning signal includes detecting that the object exists in the right rear side of the vehicle, and generating the advance warning signal to avoid collision with the object when determining that the driver's gaze region belongs to the third area.

19. The method of claim 11, wherein the object is not in a viewing zone of the driver, the generating of the advance warning signal includes calculating a gaze movement time for moving a center point of a viewing zone of the driver to the object and a avoidance control time for the driver to sense the object and avoid collision, and generating the advance warning signal at a first time point at which the gaze movement time and the avoidance control time are secured.

20. The method of claim 11, wherein the advance warning signal includes a display and a warning sound generated by an HMI (Human Machine Interface) provided in the vehicle and a vibration generated by a haptic module provided in the vehicle.

* * * * *